June 2, 1942.   C. E. DE YETTE   2,285,019
MEANS FOR PROCESSING FILM
Filed March 28, 1941    2 Sheets-Sheet 1
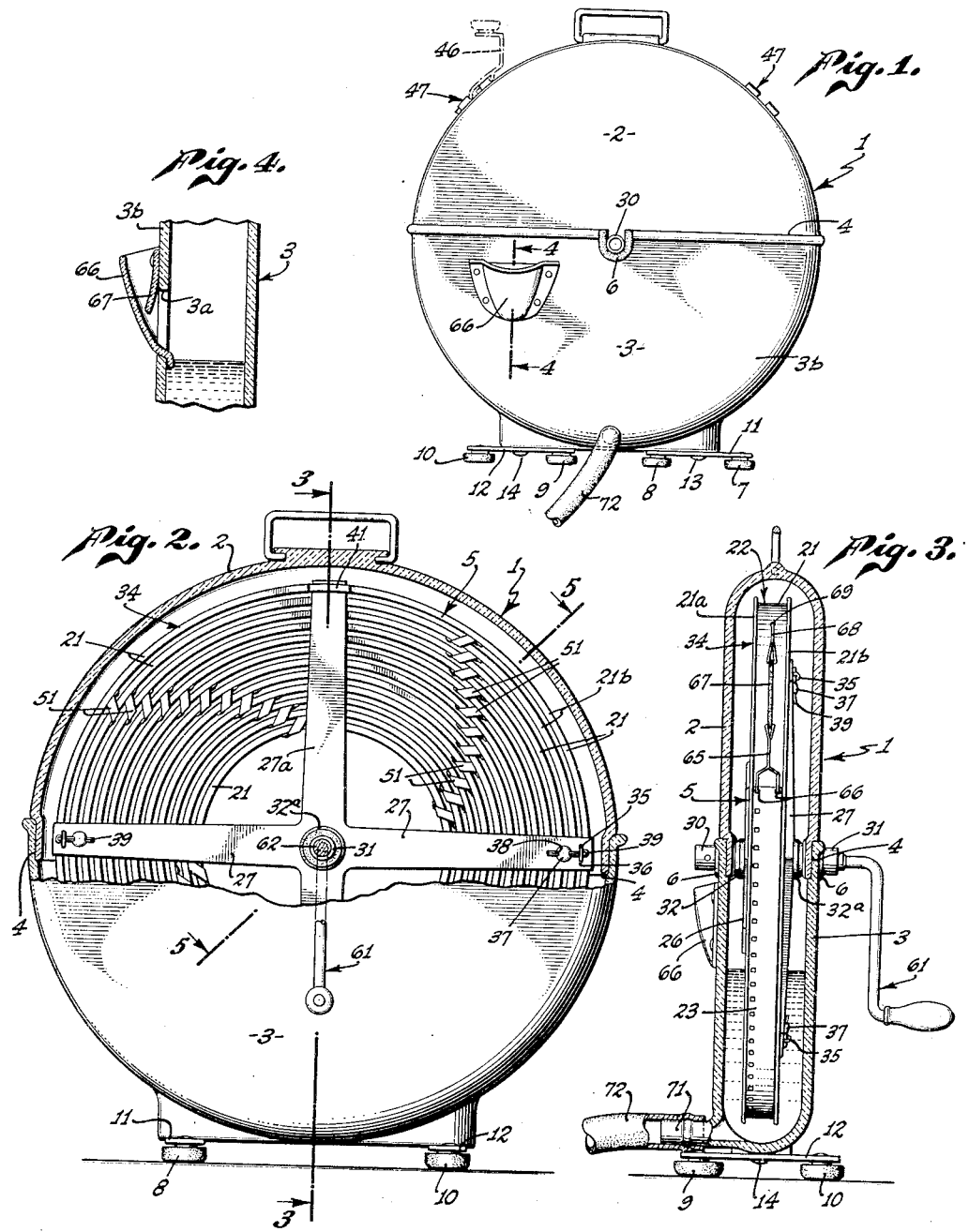
INVENTOR:
CLARENCE E. DEYETTE,
BY
ATTORNEY

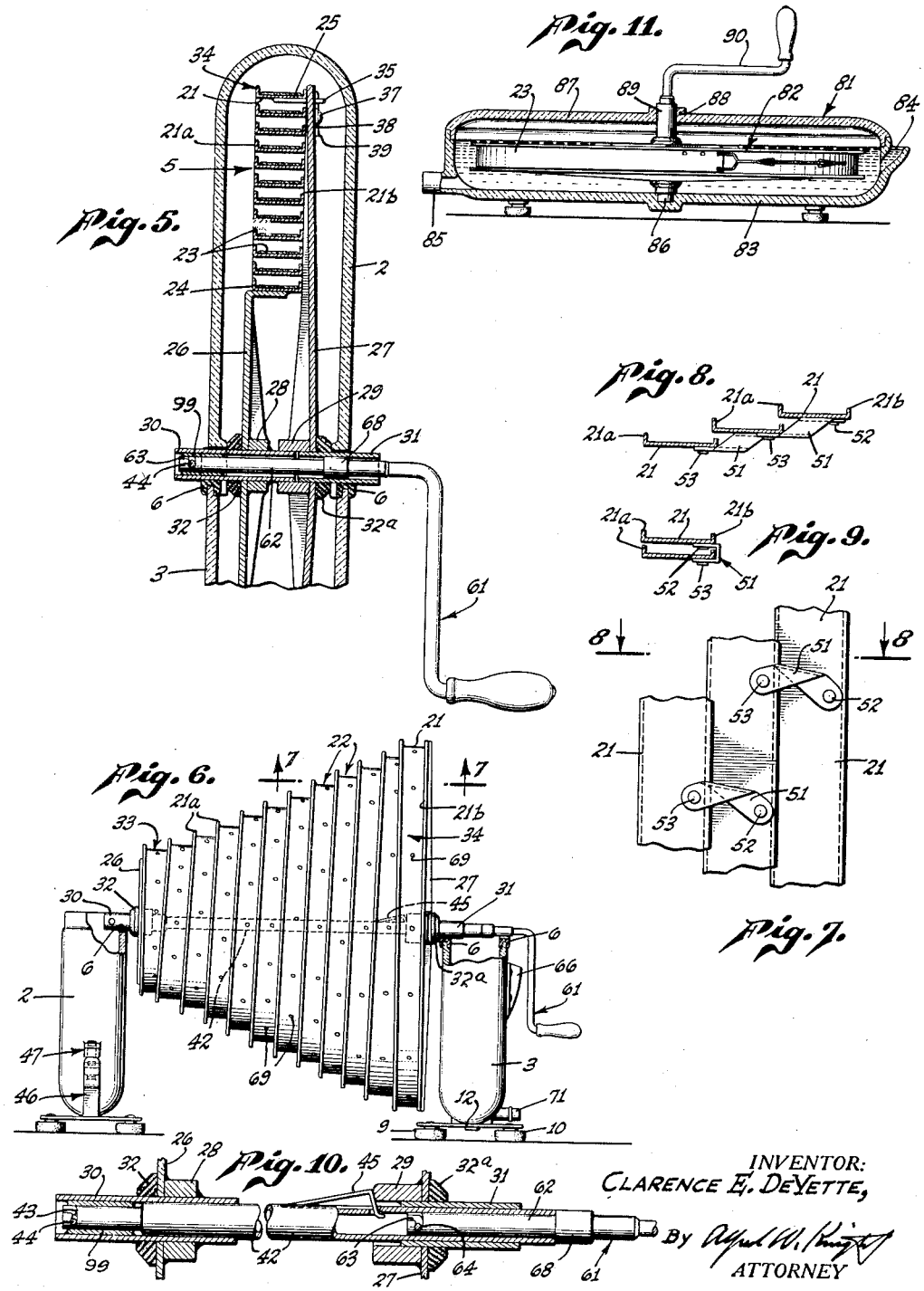

Patented June 2, 1942

2,285,019

UNITED STATES PATENT OFFICE 2,285,019

MEANS FOR PROCESSING FILM

Clarence E. De Yette, Los Angeles, Calif.

Application March 28, 1941, Serial No. 385,703

7 Claims. (Cl. 242—77)

This invention relates to an apparatus for processing film and is particularly directed to an apparatus for processing relatively long strips of film such as motion picture film.

A particular object of the invention is to provide an apparatus by means of which a strip of motion picture film may be conveniently handled during processing.

Another object of the invention is to provide an apparatus by means of which an amateur photographer may process a roll of motion picture film.

Another object of the invention is to provide a film holder which may be readily loaded with the film to be processed.

A further object of the invention is to provide a film holder upon which the film may be kept during all the processing steps including exposure for reversal and drying.

Another object of the invention is to provide a film holder which may be moved to an extended position during the process steps of loading, exposure for reversal and drying, and may be moved to a telescoping position in which it occupies a minimum volume during the process steps that include the immersion of the film in a liquid.

Another important object of the invention is to provide a complete film processing apparatus including a film holder and processing tank which may be packed in a small space for storage and transportation.

Further objects and advantages of the invention will either be specifically pointed out in the ensuing description or will become apparent therefrom.

I have illustrated my invention in the accompanying drawings and referring thereto:

Fig. 1 is a side elevation of a complete film processing apparatus according to my invention;

Fig. 2 is a side elevation of the aparatus of Fig. 1 taken from the opposite side and with part of the tank broken away to illustrate a film holder according to this invention;

Fig. 3 is a transverse view taken generally along line 3—3 in Fig. 2 showing the tank in section and the film holder in elevation and rotated 45° with respect to its position in Fig. 2;

Fig. 4 is a sectional detail taken along 4—4 in Fig. 1 illustrating the construction of the light trap in the liquid inlet for the tank;

Fig. 5 is a sectional view taken generally along line 5—5 in Fig. 2 with the film holder rotated 45° with respect to its position in Fig. 2;

Fig. 6 is an elevational view showing the film holder in its extended position and the employment of the parts of the tank as supports for the film holder;

Fig. 7 is a view taken along line 7—7 in Fig. 6 illustrating the construction of the film holder;

Fig. 8 is a view taken along line 8—8 in Fig. 7;

Fig. 9 is a sectional view of two adjacent turns when the spiral is compacted, taken along a line corresponding to line 8—8 in Fig. 7;

Fig. 10 is an enlarged sectional detail of the shaft and bearing construction illustrating the relation of these parts when the holder is in the position illustrated in Fig. 6; and Fig. 11 is a partly sectional elevation of a modified form of apparatus.

Referring to Figs. 1 to 5 of the drawings, the apparatus is shown as comprising a light-tight tank 1 of any suitable material such as molded plastic. The tank comprises an upper portion 2 and a lower portion 3 telescopically fitted together at 4 to form a light-tight joint. A film holder 5 is shown in position within the tank 1 and journaled for rotation therein on suitable bearings 6 provided in the tank 1, the tank portions 2 and 3 providing the respective upper and lower portions of the bearings. The lower tank portion 3 is provided with suitable feet 7, 8, 9, and 10. The feet 7 and 8 are mounted on a cross arm 11 and the feet 9 and 10 are mounted on the cross arm 12. These arms are respectively pivotally mounted to the lower extremities of the lower tank portion 3 by means of rivets 13 and 14 located in the centers of the respective arms, whereby they may be rotated to save space when the apparatus is packaged.

The film holder 5 is shown as comprising a member 21 wound in spiral form to define a continuous spiral shelf having a plurality of radially spaced turns. The radially outwardly facing surface of member 21 (the face of the shelf), indicated at 22 in Fig. 6 is of sufficient width to accommodate the film to be processed and is adapted to receive and support a strip of such film. For example, the surface 22 may be of such width as to conveniently accommodate 8, 16, or 35 mm. film and the number of turns and the diameter thereof may be such as for the surface 22 to accommodate 25, 50, or 100 feet, for example, of such film. The film is indicated in position on the holder at 23 in Figs. 3 and 5.

The member 21 is preferably formed of thin metal or other relatively flexible material and is preferably channel shaped. The radially extending sides of the channel are indicated at 21a and 21b. The side 21b is preferably somewhat lower than the side 21a in order to give clearance during axial displacement of the spiral as will be explained subsequently.

The inner and outer ends of the spiral member 21 are indicated at 24 and at 25 respectively and are shown respectively attached to spider arms 26 and 27. These arms are carried on hubs 28 and 29 which are in turn carried by hollow shafts 30 and 31. Suitable rubber gaskets are indicated at 32 and 32a for preventing leakage of liquid and light through the bearings 6. The shaft 31 stops somewhat short of the end of the hub 29 and the shaft 30 extends into the hub 29 in abutment with the shaft 31 whereby the hub 29 axially aligns the shafts.

The innermost turn of the spiral indicated at 33 is preferably fixedly attached to the spider arms 26 and for convenience this innermost turn is usually formed substantially as a complete circle. The outermost turn of the spiral indicated at 34 is preferably also formed substantially as a complete circle and it is preferably removably attached to the spider arms 27. The outer turn 34 is shown provided with a plurality of longitudinally extending lugs 35 located at spaced positions along the circumference thereof, which lugs are adapted to extend through slots 36 provided in a plurality of the arms 27. The arms 27 are provided with projecting portions 37, located radially inwardly from the slots 36, each provided with bore 38 adapted to receive a pin such as a cotter pin 39. The pin extends through an opening in the lug 35 and thence into the bore 38 and prevents longitudinal movement of the lug. One of the spider arms, for example, the arm 27a may be slipped into a slot provided in the outer turn 34 by deforming a portion thereof outwardly as indicated at 41.

The lateral flexibility of the member 21 is such that the outer turns 33 and 34 may be displaced axially to displace the adjacent turns of the spiral axially with respect to one another to place the spiral in the extended position indicated in Fig. 6. The member then takes the form of a conical spiral. This displacement is preferably produced by inserting an extension shaft 42 (see Fig. 10) provided with a J slot 43 at its outer end through the sleeves 31 and 30 to engage a pin 44 with the J slot 43. The shaft 42 is pressed toward the pin 44 while the spider arms 27 are held fast to displace the turns of the spiral. Suitable means such as an umbrella fastener 45 engaging the inner end of the sleeve 31 is provided for holding the ends of the spiral in displaced position. The holder may be journaled for rotation on the tank portions 2 and 3 with its axis in a horizontal position. The bearings 6 in the upper and lower tank portions may be used for this purpose and suitable supporting legs indicated at 46 may bt fitted on the tank portion 2. One of these legs is indicated in dot-dash lines in Fig. 1 and in full lines in Fig. 6. Suitable stirrups are indicated at 47 for use in removably attaching these legs.

Suitable means is provided for limiting the axial displacement of the adjacent turns of the spiral when the ends of the spiral are displaced as indicated in Fig. 6. Referring to Figs. 7, 8, and 9, such means are shown as comprising a plurality of links 51 pivotally secured at their ends as at 52 and 53 to the lower faces of the adjacent turns 21. The links 51 are generally U-shaped when viewed in end elevation whereby they permit the adjacent turns to reach a position of radial super-imposition when the spiral is telescoped as indicated in Fig. 9. For clarity only two turns and a single link are shown in Fig. 9. The links also tend to hold the turns of the spiral in shape by preventing undue radial displacement of the adjacent turns. For clarity the heads of the rivets 52 and 53 have been shown somewhat thicker than they will be in a device as constructed. Obviously they will be sufficiently thin or other measures will be taken whereby there will be sufficient clearance between the heads of the rivets and the turns of the spiral to allow for the desired displacement of the turns.

To process a motion picture film on this apparatus the ends of the spiral are first displaced to bring the film holding shelf into the form of a conical spiral as indicated in Fig. 6. This may be accomplished as previously described by the use of the extension shaft 42. The upper and lower tank portions 2 and 3 may be set up a suitable distance apart as indicated in Fig. 6 and the tank portion 2 may be fitted with the feet 46. Thus the tank portions 2 and 3 act as standards for supporting the sleeve shafts 30 and 31 respectively and the portions of the bearing 6 in the respective tank portions support the sleeve shafts for rotation. A suitable crank indicated at 61 may be inserted in the extension shaft 42. The end of the shaft portion of the crank indicated at 62 is preferably of the same diameter as the interior of the shaft 42 and is provided with a J slot 63 in its end which is adapted to engage a pin 64 in the inside of the shaft 42. Thus the shaft 42 and the film holder 5 may be rotated by means of the crank 61. One end of the film 23 may be suitably attached to either end of the spiral, for example, to the innermost turn 33. The crank 61 may then be rotated to wind the film on to the turns of the spiral. This operation may be accomplished with facility due to the fact that each inner turn is substantially unobstructed radially by an adjacent outer turn. When the end of the film is reached it may be suitably attached to the spiral.

Assuming, for example, that the end of the film is located on the outer turn 34 as indicated in Fig. 3, it may be engaged with suitable U-shaped wire clip 65 adapted to engage perforations 66 in the film, either normally present or specially provided, and connected by means of a rubber band 67 to another clip 68 adapted to engage a suitable one of a plurality of spaced openings 69 provided in the face of the film supporting shelf. The other end of the film may be attached to an inner turn of the spiral in a similar manner. Most motion picture films have two rows of perforations. The film 23 is indicative of such a film although only a single row of perforations has been shown. The use of rubber bands or other elastic fastening means tends to keep the film taut during the processing operations. The openings 69 serve not only to facilitate the fastening of the film but also to prevent the accumulations of liquid beneath the film during the processing operation.

After the loading operation as above described has been completed the umbrella clip 45 is depressed and the extension shaft 42 removed to collapse or telescope the turns of the spiral. The spiral is then placed in position in the lower tank portion 3 with the sleeve shafts journaled in the bearing portions 6. The upper tank portion 2 is then placed in position on the lower tank portion 3 and the apparatus assumes the relations indicated in Figs. 1 to 5. Obviously all of the above operations are carried out in a dark room if the process step so requires.

The processing liquid, for example, a developing solution is then loaded into the tank 1. A suitable opening 3a is provided in the wall 3b of the tank portion 3 for this purpose. A suitable spout 66 is shown attached to the wall 3b to facilitate the pouring of liquids into the opening. A light shield 67 is shown extending into the spout 66 to prevent the direct entrance of light into the opening 3a.

The crank 61 is then inserted into the sleeve shafts 31 and 30 and the J slot 63 is placed in engagement with the pin 44. A suitable shim 68 is positioned on the crank shaft portion 62 and is adapted to make a sliding fit with the interior of the sleeve 31 to prevent wobbling of the crank. Another sleeve 99 is provided in the interior of the sleeve shaft 30 which is adapted to make a sliding fit with the outer surface of the crank shaft 62. The film holder is then rotated for a suitable length of time to thoroughly contact all of the film with the developing solution. The solution is then drained through an outlet opening 71 provided in the lower portion of the tank. A suitable hose 72 is shown attached to this outlet for disposing of the liquid. Suitable precautions are taken to prevent loss of liquid through the outlet when it is desired to maintain liquid within the tank.

Washing and fixing operations and other liquid-contacting operations as desired, may be carried out in the same manner as the above described developing operation.

If it is desired to expose the film to light for a reversal procedure, the film holder may be removed from the tank and placed in the extended position as indicated in Fig. 6 and rotated while exposed to light. The film may also be dried with the reel or holder in the extended position indicated in Fig. 6. In this connection it is preferable to support the film holder with the axis of the spiral in a vertical position. When the holder is so positioned the radially extending sides 21a and 21b of the film supporting shelf act not only to hold the film in position on the shelf but also to shield the film from dust. If desired, the spider arms 27 may be removed from the spiral during drying and may be used with another spiral holder if it is desired to process another roll of film at that time.

It should be obvious that it is not necessary to use a tank in which the axis of the spiral is horizontal. For example, a relatively flat tank may be used as indicated at 81 in Fig. 11. In this figure a spiral film holder 82 of the type previously described is shown journaled for rotation about a substantially vertical axis in the tank 81. This tank is shown as comprising a lower portion 83 provided with liquid inlet and outlet openings 84 and 85 respectively and a thrust bearing 86 for supporting the holder 82. The tank further comprises a lid portion 87 adapted to tightly cover the tank portion 83 and provided with suitable bearing 88 through which the shaft 89 of the holder extends. A suitable crank is indicated at 90 for rotating the holder in the tank.

My invention is subject to considerable modification and hence I do not choose to be limited to the illustrated embodiments disclosed herein but rather to the scope of the appended claims.

I claim:

1. A film holder, comprising: a member formed as a spiral having a plurality of radially spaced turns, the radially outwardly facing surface of said member being adapted to receive and support a strip of film, the ends of said member being movable axially to displace the adjacent turns axially with respect to one another; means for holding the film in position on said surface and for constraining said film to move with said member when said adjacent turns are displaced axially and means associated with said member for limiting the axial displacement of the turns.

2. A film holder, comprising: a member formed as a spiral having a plurality of radially spaced turns, the radially outwardly facing surface of said member being adapted to receive and support a strip of film, the ends of said member being movable axially to displace the adjacent turns axially with respect to one another; means for holding the film in position on said surface and for constraining said film to move with said member when said adjacent turns are displaced axially and a plurality of links pivotally connected to adjacent turns for limiting axial and radial displacement of the turns.

3. A film holder, comprising: a member formed as a spiral having a plurality of radially spaced turns, the radially outwardly facing surface of said member being adapted to receive and support a strip of film, the ends of said member being movable axially to displace the adjacent turns axially with respect to one another between a position in which said turns are substantially in radial super-imposition and a position in which said surface is substantially unobstructed radially by adjacent turns; means for holding the film in position on said surface and for constraining said film to move with said member when said adjacent turns are displaced axially and means associated with said member for limiting the axial displacement of the turns.

4. A film holder, comprising: a member formed as a spiral having a plurality of radially spaced turns, the radially outwardly facing surface of said member being adapted to receive and support a strip of film, the ends of said member being movable axially to displace the adjacent turns axially with respect to one another between a position in which said turns are substantially in radial superimposition and a position in which said surface is substantially unobstructed radially by adjacent turns; means for holding the film in position on said surface and for constraining said film to move with said member when said adjacent turns are displaced axially and a plurality of links pivotally connected to adjacent turns for limiting axial and radial displacement of the turns.

5. A film holder, comprising: a member formed as a spiral having a plurality of radially spaced turns, the radially outwardly facing surface of said member being adapted to receive and support a strip of film, the ends of said member being movable axially to displace the adjacent turns axially with respect to one another; axially spaced radially outwardly extending side members extending from said surface and adapted to maintain the film in position on said surface; and means associated with said member for limiting the axial displacement of the turns.

6. A film holder, comprising: a relatively thin elongated member of shallow generally channel-shaped cross-section wound in spiral form with the front face of the channel facing radially away from the axis of the spiral to define a continuous spiral shelf having a plurality of radially spaced turns for receiving and supporting a strip of film, the ends of said member being mounted for axial displacement with respect to one another, whereby said spiral shelf may be alternatively placed in positions defining flat and conical spirals; and means intersecuring adjacent turns of the member at a plurality of spaced positions for limiting the displacement of the adjacent turns of the member.

7. A film holder, comprising: a pair of axially aligned bearing members; and an elongated member wound in spiral form to define a continuous spiral shelf having a plurality of radially spaced turns, the radially outwardly facing face of said spiral shelf being adapted to receive a strip of film in supporting relation thereto, and the respective inner and outer ends of said elongated member being carried by the respective bearing members, said bearing members being displaceable axially with respect to one another to change the separation of the ends of said elongated member, whereby said spiral shelf may alternatively be placed in positions defining flat and conical spirals.

CLARENCE E. DE YETTE.